United States Patent [19]
Bartley et al.

[11] Patent Number: 4,750,204
[45] Date of Patent: Jun. 7, 1988

[54] PRESTONE PHONE LOCK

[76] Inventors: Kenneth G. Bartley, 1900 Albemarle Rd., Brooklyn, N.Y. 11226; George Spector, 233 Broadway Rm. 3815, New York, N.Y. 10007

[21] Appl. No.: 904,932

[22] Filed: Sep. 8, 1986

[51] Int. Cl.⁴ .......................................... H04M 1/66
[52] U.S. Cl. ............................... 379/445; 70/DIG. 72
[58] Field of Search ............... 179/189 R, 189 D, 184; 379/437, 445, 447, 451; 70/DIG. 72

[56] References Cited
U.S. PATENT DOCUMENTS

| | | | |
|---|---|---|---|
| 1,090,053 | 3/1914 | Harvey | 379/445 |
| 2,588,176 | 3/1952 | Strauch | 379/445 |
| 3,495,050 | 2/1970 | Bart | 379/445 |
| 3,624,317 | 11/1971 | Buckingham et al. | 379/445 |
| 3,899,647 | 8/1975 | Nachsi et al. | 379/445 |
| 3,965,310 | 6/1976 | Willy | 379/445 |
| 4,005,279 | 1/1977 | Richter | 379/445 |
| 4,081,630 | 3/1978 | Washburn et al. | 379/445 |
| 4,297,539 | 10/1981 | Fairbanks | 379/445 |
| 4,323,739 | 4/1982 | Flax et al. | 379/445 |
| 4,396,810 | 8/1983 | Cover | 379/445 |

Primary Examiner—Jin F. Ng
Assistant Examiner—Danita R. Byrd

[57] ABSTRACT

A telephone dial shielding device is provided to cover the dialing area on a telephone base to prevent an unauthorized person from making calls therefrom. A modification includes a door which when unlocked will uncover the dialing area so that a person can make calls without removing the device completely from the telephone base.

4 Claims, 1 Drawing Sheet

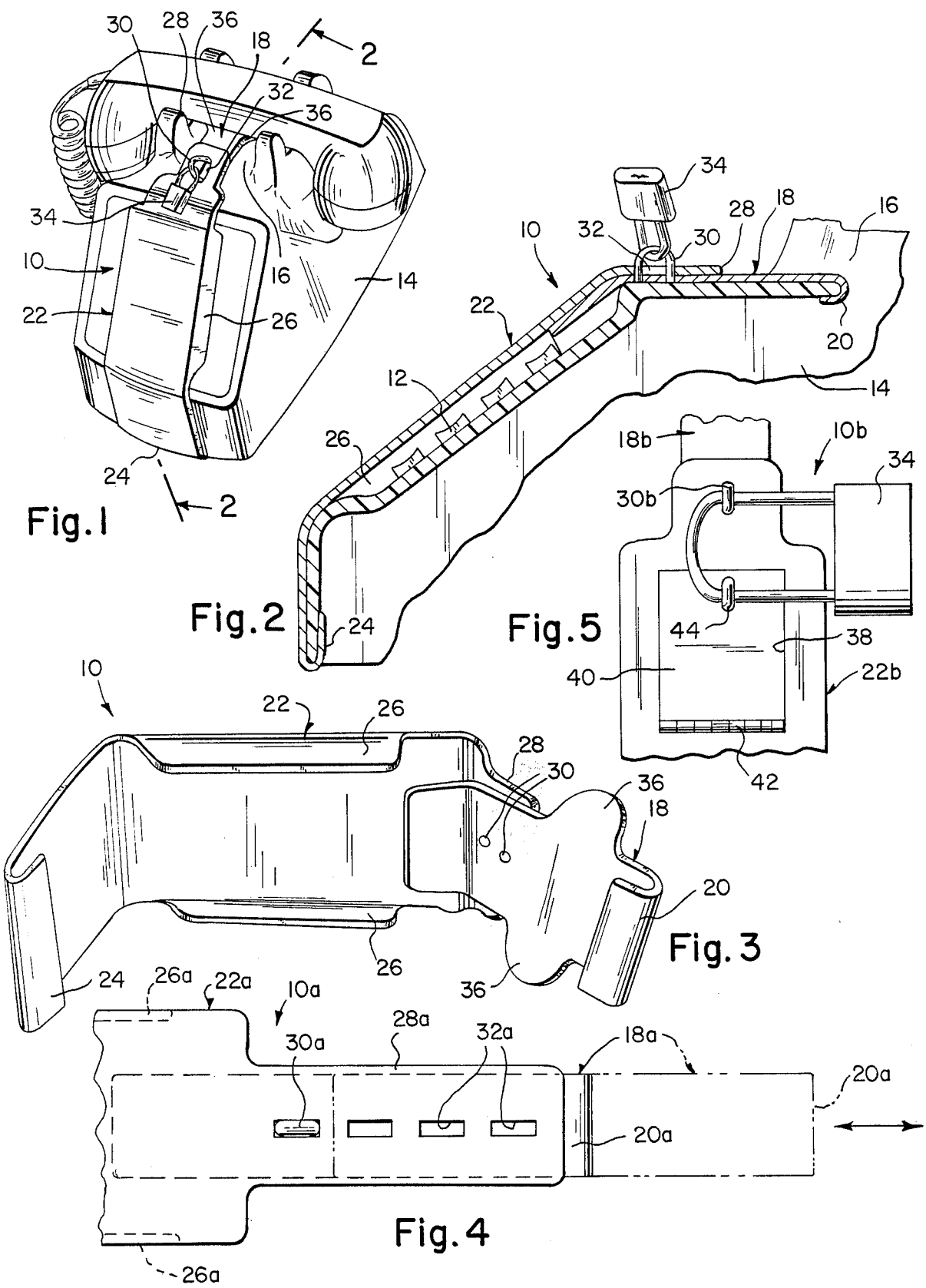

PRESTONE PHONE LOCK

BACKGROUND OF THE INVENTION

The instant invention relates generally to telephone protection devices and more specifically it relates to a telephone dial shielding device.

Numerous telephone protection devices have been provided in prior art that are adapted to prevent operation of the dialing areas of telephones. For example, U.S. Pat. Nos. 3,495,050; 3,965,310 and 4,005,279 all are illustrative of such prior art. While these units may be suitable for the particular purpose to which they address, they would not be as suitable for the purposes of the present invention as heretofore described.

SUMMARY OF THE INVENTION

A primary object of the present invention is to provide a telephone dial shielding device that will overcome the shortcomings of the prior art devices.

Another object is to provide a telephone dial shielding device that will cover the dialing area on a telephone base to prevent an unauthorized person from making calls from the home and office.

An additional object is to provide a telephone dial shielding device that includes a door which when unlocked will uncover the dialing area so that a person can make calls without removing the device completely from the telephone base.

A further object is to provide a telephone dial shielding device that is simple and easy to use.

A still further object is to provide a telephone dial shielding device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a telephone in which dialing area is prevented from being activated by the invention attached thereto.

FIG. 2 is a cross sectional view taken along line 2—2 in FIG. 1.

FIG. 3 is a bottom perspective view of the invention.

FIG. 4 is a top view with parts broken away of a modification in which the strap member is adjustable for different sizes of telephone bases.

FIG. 5 is a top view with parts broken away of another modification in which the shield member contains a door to cover the dialing area.

DETAILED DESCRIPTION OF THE PREFERRED EMBODIMENTS

Turning now descriptively to the drawings, in which similar reference characters denote similar elements throughout the several views, FIGS. 1 through 3 illustrates a telephone dial shielding device 10 for preventing access to a dialing area 12 of a telephone base 14 that has a cradle 16. The device 10 consists of a strap member 18 adapted to be positioned between the cradle 16 of the telephone base 14. The strap member 18 has a hook portion 20 formed along a rear edge thereof for attachment to the cradle 16. A shield member 22 is adapted to be positioned upon the telephone base 14 for covering the dialing area 12. The shield member 22 has a hook portion 24 formed along a front edge thereof for attachment to front of the telephone base 14. A pair of flange portions 26 are each formed along an opposite side edge and extend downwardly therefrom for enshrouding the dialing area 12. A top extension portion 28 is for overlapping part of the strap member 18.

A staple 30 is secured to the strap member 18 and the extension portion 28 of the shield member 22 has a slot 32 therethrough which is so positioned to fit over the staple 30 for securing the strap member to the shield member. A padlock 34 is provided to engage with the staple 30 on the strap member 18 to prevent removal of the device 10 from the telephone base 14 thus locking the strap member 18 to the shield member 22. The strap member 18 further includes a pair of tab portions 36, each formed along an opposite side edge and extends outwardly therefrom to restrict sideways movement of the strap member 18 between the cradle 16.

FIG. 4 shows a modification in which the strap member 18a is elongated and flexible. The extension portion 28a of the shield member 22a is elongated and has a plurality of spaced apart slots 32a therethrough so that any one of the slots 32a can fit over the hasp 30a thus making the strap member 18a adjustable to fit on various sizes of the telephone base 14.

FIG. 5 shows another modification in which the shield member 22b has an aperture 38 which extends around perimeter of the dialing area 12 of the telephone base 14. A door 40 covers the aperture 38 and is pivotly attached at hinge 42 to the shield member 22b at lower edge thereof. A second staple 44 is secured to the door 40. The padlock 34 can engage with the first staple 30b on the strap member 18b and the second staple 44 on the door simultaneously preventing removal of the device 10b from the telephone base 14 and at the same time lock the door 40 to prevent access to the dialing area 12 of the telephone base 14 when the door 40 is in a closed position.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A telephone dial shielding device for preventing access to a dialing area of a telephone base having a cradle, comprised of spaced supports, said device comprising:
   (a) a strap member adapted to be positioned between said supports, said strap member having a hook portion formed along a rear edge thereof for attachment to said cradle;
   (b) a shield member adapted to be positioned upon said telephone base for covering said dialing area, said shield member having a hook portion formed along a front edge thereof for attachment to front of said telephone base, a pair of flange portions, each formed along an opposite side edge and extending downwardly therefrom for enshrouding said dialing area and a top extension portion for overlapping part of said strap member;

(c) means for securing said strap member to said shield member, wherein said securing means includes:

(d) a staple secured to said strap member; and (e) said extension portion of said shield member having a slot therethrough positioned to align with said staple wherein said strap member further includes a pair of tab portions, each formed along an opposite side edge and extending outwardly therefrom to restrict sideways movement of said strap member between said supports.

2. A telephone dial shielding device as recited in claim 1, further comprising:

(f) said extension portion of said shield member being elongated and having a plurality of spaced apart slots therethrough so that any one of said slots can fit over said staple thus making said strap member adjustable to fit on various sizes of said telephone base.

3. A telephone dial shielding device comprising a strap adapted to be secured to a telephone cradle and a shield overlying the dial of a telephone:

(a) said shield having an aperture which extends around the perimeter of said dial, a hook for securing said shields to the telephone base and an extension overlapping said strap;

(b) a door to cover said aperture and pivotly attached to said shield; and (c) means for simultaneously securing the door to the shield and the strap to the shield.

4. A device as in claim 3, wherein said means comprise a first staple on the door and a second staple on said strap extending through a slot in said shield extension in combination with a lock adapted to pass through said staples.

* * * * *